April 8, 1958 J. W. DANIELS Re. 24,451

SWINGABLE BOAT PROPULSION AND STEERING UNIT

Original Filed Sept. 3, 1954 2 Sheets-Sheet 1

INVENTOR.
JAMES W. DANIELS
BY
McMorrow, Berman + Davidson
ATTORNEYS

SWINGABLE BOAT PROPULSION AND STEERING UNIT

Original Filed Sept. 3, 1954 2 Sheets-Sheet 2

INVENTOR.
JAMES W. DANIELS
BY
McMorrow, Berman & Davidson
ATTORNEYS

United States Patent Office

Re. 24,451
Reissued Apr. 8, 1958

24,451

SWINGABLE BOAT PROPULSION AND STEERING UNIT

James W. Daniels, Fort Myers, Fla., assignor, by direct and mesne assignments, to Shal-O-Draft Boats, Inc., a corporation of Florida Original No. 2,742,013, dated April 17, 1956, Serial No. 453,992, September 3, 1954. Application for reissue April 12, 1957, Serial No. 652,639

12 Claims. (Cl. 115—41)

Matter enclosed in heavy brackets [ ] appears in the original patent but forms no part of this reissue specification; matter printed in italics indicates the additions made by reissue.

The present invention relates generally to shallow draft boats, and specifically to an inboard power unit which is shiftable to a position wholly within the boat.

Presently in use are many types of shallow draft vessels and boats for use in inland waters and various means have been used in the past to make the propeller and rudder assembly shiftable from a position beneath the boat to a position within the boat when the boat meets an obstruction or runs aground. The present invention permits the propeller and rudder assembly to be shifted upwardly a greater distance into the boat than has heretofore been possible.

The principal object of the present invention is to provide a shallow draft boat constructed with a well in which a propeller and rudder assembly is swingable from a position below the boat to a position above the well in the boat.

Another object of the present invention is to provide a propeller that is swingable upwardly above the boat so that weeds and debris that might accumulate on the propeller and on the rudder may be readily cleaned from the propeller and rudder, and that the replacement of propeller blades and rudder blades is [made] more easily [accessible] *accomplished.*

A still further object of the present invention is to provide a propeller and rudder assembly which is easily shifted upward from its position beneath the boat without disconnecting any part of the propeller or its shaft from the engine.

Yet another object of the present invention is to provide a propeller and rudder assembly which is normally extended beneath the boat and connected to an inboard engine but which upon meeting an obstruction or becoming clogged with weeds may be raised upwardly without disconnecting either the propeller and its shaft from the engine or the rudder from the rudder steering mechanism.

These and other objects and advantages of the present invention will be readily apparent from the following description when taken in connection with the annexed drawings, in which.

Figure 1:
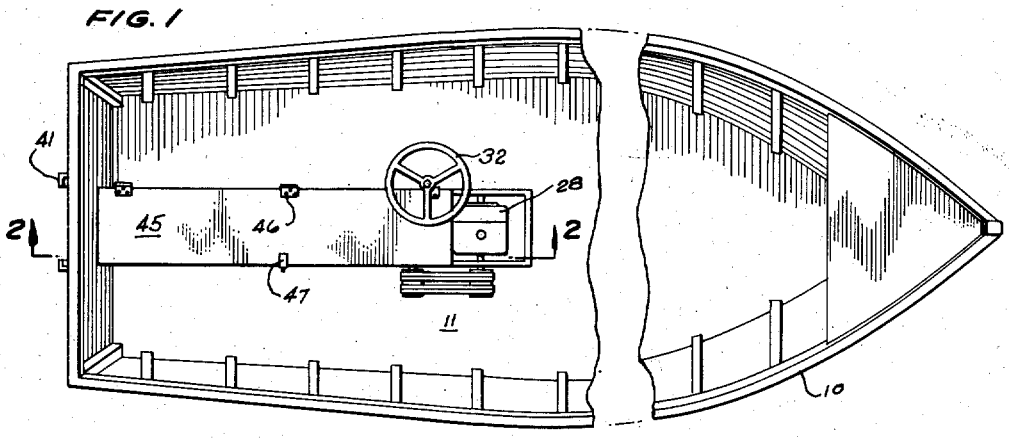
Figure 1 is a top plan view of the present invention.

Referring in greater detail to the drawing in which like numerals indicate like parts throughout the several views, the invention is seen to consist of a shallow draft boat 10, the bottom 11 of which has been provided with an opening 12 which extends from the stern end forwardly and terminates at a point spaced from the bow. [Side] *Spaced side* walls 13 and an end wall 14 at the bow end of the opening are [spaced] *arranged* in upstanding position along the sides *and front* of [an] *the* opening *12* to form a well 15.

A platform 16 normally fits across the opening 12 and adjacent one end has a rudder 17 and a propeller 18 secured by means of the rudder post bearing [19] *20* and the propeller strut [21] *19*. The platform 16 is provided with an opening 22 through which extends the drive shaft 23 which connects the propeller 18 to the gear housing 24 *which sustains the driving thrust from the propeller.* A block 25 *is supported by the thrust housing 24 and in turn* supports [the gear housing on] the platform 16 at the end opposite from the rudder and the propeller, 17 and 18 respectively.

Figure 4:
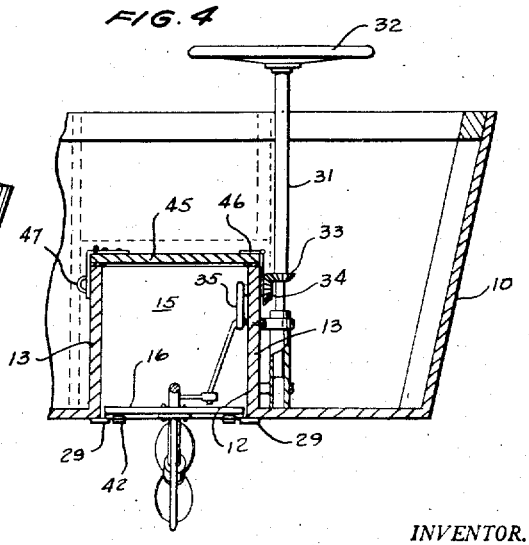
Figure 4 is a partial view in section on line 4—4 of Figure 2.
Figure 5:
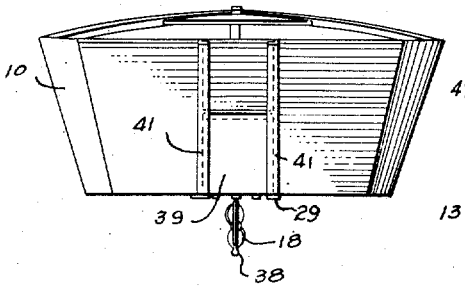
Figure 5 shows a detail of construction of the aft end of the boat.

The [gear] *thrust* housing 24 [constitutes] *contains* the driving mechanism for the propeller and is supported at each of its ends in the walls 13. Through one wall projects the shaft 26 upon which are secured the drive pulleys 27 operatively connected to the engine 28. It will be seen that the platform 16 is movable from its *substantially horizontal* position [at an angle to the horizontal] on the opening [15] *12* upwardly to a position shown in dotted lines in Figure 2 above the [shaft 26] *well 15,* there being no other support for the platform at [the] *its* end [of the platform] adjacent the engine. The platform 16 is supported in the position adjacent the lower ends of the walls by strips 29 which extend along each side of the opening and are secured to the boat bottom as seen in side elevation in Figure 2 and in end view in Figures 4 and 5.

Figure 2:
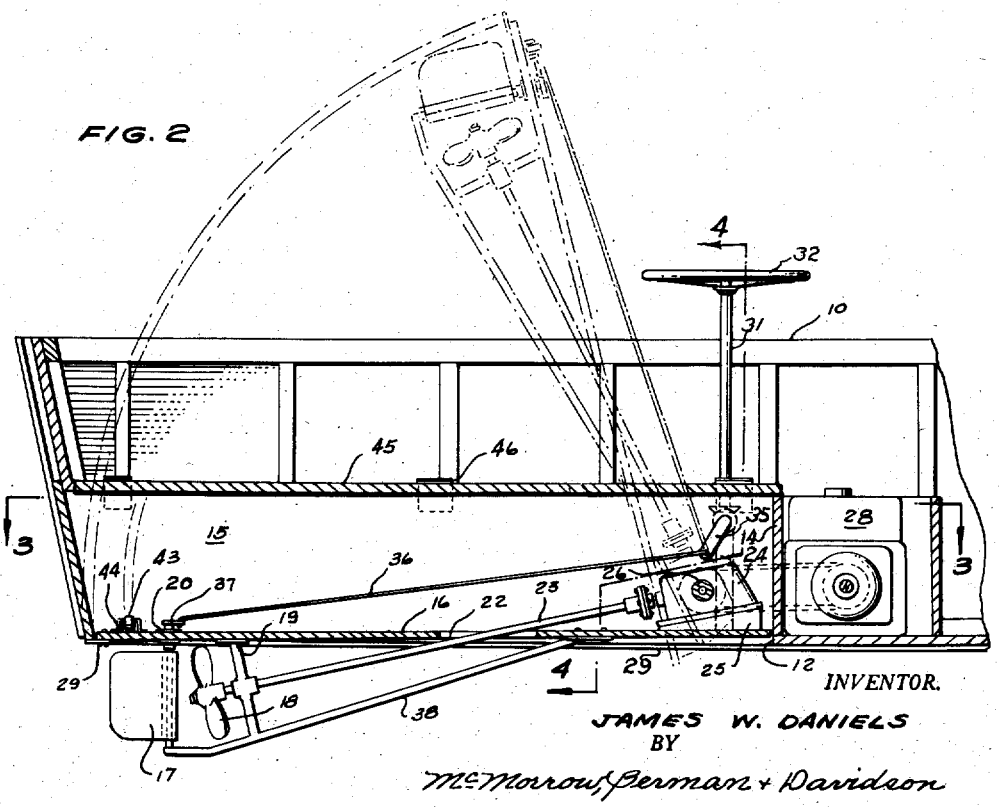
Figure 2 is a side view in cross section on line 2—2 of Figure 1 showing in dotted lines the raised position of the propeller shaft and platform.
Figure 3:
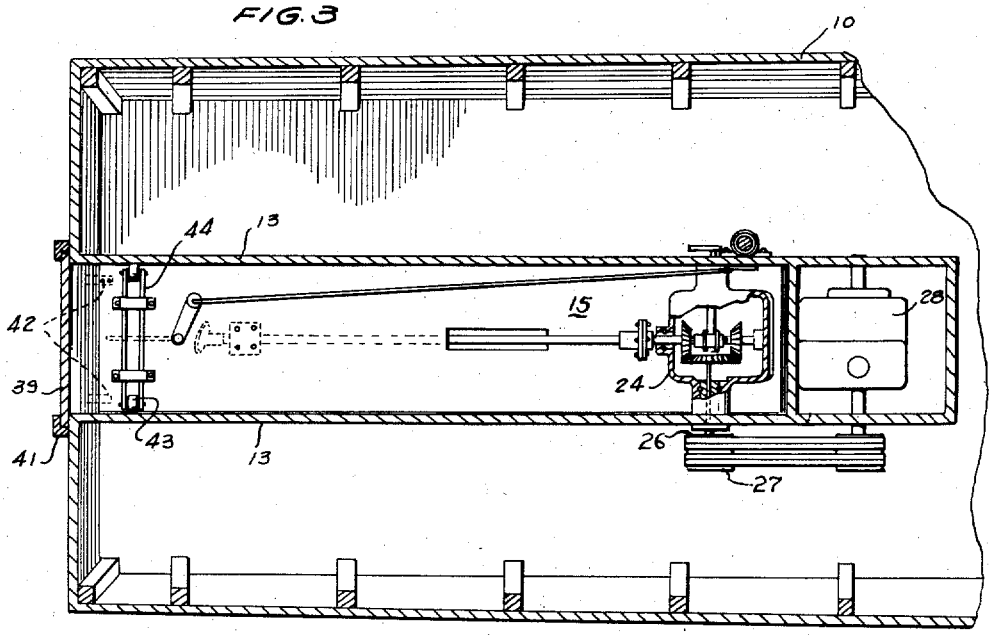
Figure 3 is a top plan view partly in section on line 3—3 of Figure 2.

*It thus will be seen that another of the advantages previously referred to is that the mounting and arrangement of these parts, as shown best in Figure 2, permits the use of a lightweight and relatively thin material for the platform 16. Only the rear portion of the propeller shaft 23 is supported by the platform, while the housing 24 from which the platform 16 is suspended rotatably receives the forward portion of shaft 23 independently of the platform, and as is also seen in Figure 3, the opening 22 in the platform is wider than the propeller shaft. Figures 2 and 3 also illustrate how forward thrust from the propeller 18 is not applied to the platform 16, but is taken by the housing 24.*

On one wall 13 of the well 15 is secured the steering mechanism consisting of an upright shaft 31 and a steering wheel 32. The shaft has a gear 33 engaging a second gear 34 which is connected to the crank arm 35 inside of the well. A control rod 36 connects the crank arm to the rudder post 37. It will be seen that when the platform 16 is raised from its *substantially horizontal* position [at an angle to the horizontal] to [the vertical] *any higher* position *even* above the walls of the well, the crank arm 35 will pivot sufficiently to permit the platform 16 to be raised without removing the control rod 36 from the rudder post.

Although it will be seen in Figure 2 that the platform 16 is connected by the shaft 26 to the walls 13 for its movement from its *substantially horizontal* position in the opening [at an angle to the horizontal] to a [vertical] *raised* position above the walls, carrying the rudder and the propeller from a position below the opening to a position above the well, the forward or bow end of the platform, being positioned slightly within the opening 12 of the well 15 will not project downwardly below the bottom of the boat upon movement of the propeller [or] *and* the rudder when the propeller [skid] *strut* 38 hits an obstruction.

This provision prevents the bow end of the platform from scooping water into the well unnecessarily. In the raised position shown in dotted lines in Figure 2, the propeller and rudder are available for cleaning and replacement, it being expected that the boat would not be traveling in the water during such period of time of replacement or cleaning.

The stern end of the well 15 is closed by a sliding panel 39 which slides upwardly in the groove strips 41 on the stern of the boat. A pair of outwardly projecting brackets 42 secured to the platform 16 at the stern end lift the sliding panel 39 when the platform is raised to the over the well position. A pair of rollers 43 ride on the inside surfaces of the walls 13 when the panel is raised and prevent jamming or lateral movement of the platform 16 with respect to the well when the boat hits an obstruction and the platform is raised. The rollers are journalled in short shafts supported in the metal frame 44. A swingable hatch cover 45 normally covers the well 15 and is secured by hinges 46 and a hasp 47.

While a single embodiment of the present invention has been here shown and described, other embodiments are contemplated within the scope of the appended claims, without departing from the spirit of the invention.

What is claimed is:

1. A shallow draft boat having an opening in the bottom thereof extending inwardly from the stern and terminating at a point spaced from the bow, spaced upstanding walls extending along the sides *and a wall extending across the front* of said opening and forming a well, [and] a *normally substantially horizontal, vertically movable* platform [having] *substantially closing the bottom of said well in all positions while it is wholly within said well,* a rudder and propeller *supported by and* adjacent [one] *the rearward* [rear] end *of said platform* and driving mechanism [thereon] operatively connected to said propeller *and supporting the forward end of said platform, said platform being* positioned [at an angle to the horizontal] between the *side* walls of said well so that one end is adjacent the stern end of said opening with the rudder and propeller below said opening, said *driving mechanism and said* platform being *pivotally* connected *within said well* [intermediate its ends] *near the forward end of said platform* to *one or more of* the walls of said well for movement *on the pivot* from [the] *the substantially horizontal* position *of said platform* [at an angle to the horizontal] to a [vertical] *raised* position *sufficiently* above the walls of said well *that the propeller and rudder are exposed above said well for examination, cleaning or repairs.*

2. A shallow draft boat having an opening in the bottom thereof extending inwardly from the stern and terminating at a point spaced from the bow, spaced upstanding walls extending along the sides *and a wall extending across the front* of said opening and forming a well, a *normally substantially horizontal* platform [having] *substantially closing the bottom of said well,* a rudder and propeller adjacent [one] *the rear* end *of said platform* and driving mechanism [thereon] operatively connected to said propeller, *said platform being* positioned [at an angle to the horizontal] between the walls of said well so that one end is adjacent the stern end of said opening with the rudder and propeller below said opening, said platform being connected [intermediate its ends] *near its forward end* to *one or more of* the walls of said well for movement from its *substantially horizontal* position [at an angle to the horizontal] to a *raised* position above the walls of said well, and means on said platform and engageable with the walls of said well when the platform is at its [angle to the] *substantially* horizontal position for maintaining said platform against lateral movement.

3. A shallow draft boat having an opening in the bottom thereof extending inwardly from the stern and terminating at a point spaced from the bow, spaced upstanding walls extending along the sides *and a wall extending across the front* of said opening and forming a well, [and] a *normally substantially horizontal* platform [having] *substantially closing the bottom of said well in all positions of the platform while it is wholly within said well,* a rudder and propeller *carried by and* adjacent [one] *the rearward* end *of said platform* and driving mechanism [thereon] operatively connected to said propeller *and supporting the forward end of said platform, said platform being* positioned [at an angle to the horizontal] between the *side* walls of said well so that one end is adjacent the stern end of said opening with the rudder and propeller *normally* below said opening, said *driving mechanism* [platform] being *pivotally* connected *within the well* [intermediate its ends] *near the forward end of said platform* to *one or more of* the walls of said well for movement about an axis transverse of said well from [its] *the substantially horizontal* position *of said platform* [at an angle to the horizontal] to a [vertical] *raised* position *sufficiently* above the walls of said well *that the propeller and rudder are exposed above the walls of the well.*

4. A shallow draft boat having an opening in the bottom thereof extending inwardly from the stern and terminating at a point spaced from the bow, spaced upstanding walls extending along the sides *and a wall extending across the front* of said opening and forming a well, [and] a *normally substantially horizontal* platform [having] *substantially closing the bottom of said well,* a rudder and propeller adjacent [one] *the rear* end *of said platform* and driving mechanism [thereon] operatively connected to said propeller, *said platform being* positioned [at an angle to the horizontal] between the walls of said well so that one end is adjacent the stern end of said opening with the rudder and propeller below said opening, said platform being connected [intermediate its ends] *near its forward end* to *one or more of* the walls of said well for movement about an axis transverse of said well from its *substantially horizontal* position [at an angle to the horizontal] to a [vertical] *raised* position above the walls of said well, and means on said platform and engageable with the walls of said well when the platform is at its [angle to the] *substantially* horizontal position for maintaining said platform against lateral movement.

*5. A shallow draft boat having an opening in the bottom thereof extending inwardly from the stern and terminating at a position spaced from the bow, spaced upstanding walls extending along the sides and an upstanding wall extending across the front of said opening, and forming a well, a normally substantially horizontal platform substantially closing the bottom of said well, a strut beneath the rear end of said platform supported by said platform and having an extension beneath and rearward of the propeller, a sleeve bearing carried by said strut, a propeller shaft journalled in said bearing, a propeller on said shaft to the rear of said bearing, a rudder carried by said platform to the rear of said propeller and journalled in said platform and the rearward extension of said strut, a power transmission housing, a pivotal support for said housing carried within the well by one or more of the walls of said well, said housing supporting the forward end of said platform, a thrust bearing in said housing for the forward end of the propeller shaft, said platform and the associated propeller and rudder being adapted to swing upwardly about said pivotal support if the strut hits bottom or other obstruction, thus decreasing the draft of the boat.*

*6. A shallow draft boat having an opening in the bottom thereof extending inwardly from the stern and terminating at a position spaced from the bow, spaced upstanding walls extending along the sides and an upstanding wall extending across the front of said opening to form a well, a normally substantially horizontal platform substantially closing the bottom of said well, strut*

*means depending from and supported by said platform and extending downwardly and rearwardly, a propeller shaft journalled by said strut means and extending upwardly in a forward direction through said platform, a propeller on said shaft to the rear of said strut means, a rudder depending from and supported by said platform and the rearward extension of said strut to the rear of said propeller, shaft receiving means for rotatably receiving the forward portion of said shaft above said platform, support means secured to the forward portion of said platform for supporting the same and rigidly connected to said shaft receiving means, and pivotal means for rotatably securing said support means within the well to certain of said walls to enable said platform, propeller and rudder to swing upwardly into said well to decrease the draft of the boat if said strut means hits bottom or other obstruction.*

*7. A shallow draft boat having an opening in the bottom thereof extending inwardly from the stern and terminating at a position spaced from the bow, spaced upstanding walls extending along the sides and an upstanding wall extending across the front of said opening, and forming a well, a normally substantially horizontal platform substantially closing the bottom of said well, a strut beneath the rear end of said platform supported by said platform, a sleve bearing carried by said strut, a propeller shaft journalled in said bearing, and extending forwardly and upwardly freely through an opening in said platform, a thrust bearing for said shaft journalled within the well on one or more of said upstanding walls to rock on its horizontal axis when the rear end of the platform is raised in the well, a rudder carried in part by said strut near the rear end of said platform and movable therewith, the opening through the platform permitting lateral movement of the propeller shaft with respect to the platform when the platform is twistingly deflected by side forces on the rudder.*

*8. A shallow draft boat having an opening in the bottom thereof extending inwardly from the stern and terminating at a position spaced from the bow, spaced upstanding walls extending along the sides and an upstanding wall extending across the front of said opening to form a vertically open well, a normally substantially horizontal platform substantially closing the bottom of said well, a strut depending from and supported by said platform, a propeller shaft journalled by said strut and extending upwardly in a forward direction through said platform, a propeller on said shaft to the rear of said strut, a rudder depending from and supported by said platform and strut to the rear of said propeller, shaft receiving means for rotatably receiving the forward portion of said shaft above said platform and secured to the forward portion of the platform for supporting the latter, and means for pivotally securing said shaft receiving means to certain of said walls within the well to enable said platform, rudder and propeller to be swung upwardly through and above said well to give access to the rudder and propeller from within the boat.*

*9. A shallow draft boat comprising upstanding wall means forming a well extending forwardly from the stern into the midship portion of the boat, said well having an open top and an open bottom and providing communication between the inside and outside of the boat through the bottom thereof, a propeller and rudder assembly including a platform in and substantially coextensive with said open bottom and a propeller and rudder supported by and depending from said platform adjacent the rearward end thereof, and mounting means in said well pivotally connecting the forward portion of said platform to said wall means in the forward portion of said well for mounting said assembly to swing about an axis extending transversely of said well between a position wherein said platform substantially closes said open bottom and said propeller and rudder are positioned therebelow and a position wherein said platform extends upwardly through said open top and said propeller and rudder are exposed above said wall means and are accessible from within the boat.*

*10. A shallow draft boat as set forth in claim 9 wherein said mounting means includes driving mechanism in said well operatively connected to said propeller.*

*11. A shallow draft boat as set forth in claim 9 wherein a member secured to said platform and depending therefrom below said rudder and propeller is operable, if said member hits bottom or other obstruction during operation of the boat, automatically to swing said propeller aad rudder assembly from its first said position upwardly into said well for decreasing the draft of the boat.*

*12. A shallow draft boat as set forth in claim 11 wherein wall means includes a closure member closing the stern end of said well and operable to open and close said stern end, and means on and movable with said propeller and rudder assembly and engageable with said closure member for operating the same to open said stern end of said well when said assembly is swung from its first said position upwardly into said well.*

References Cited in the file of this patent or the original patent

UNITED STATES PATENTS

| | | |
|---|---|---|
| 695,717 | Gardiner | Mar. 18, 1902 |
| 1,900,180 | Harvey | Mar. 7, 1933 |
| 2,076,603 | Svendsen | Apr. 13, 1937 |
| 2,265,079 | Mettair | Dec. 2, 1941 |
| 2,415,183 | Law | Feb. 4, 1947 |
| 2,569,802 | Daniels | Oct. 2, 1951 |

FOREIGN PATENTS

| | | |
|---|---|---|
| 326,868 | France | June 8, 1903 |
| 878,610 | Germany | June 5, 1953 |